(12) United States Patent
Fleming (10) Patent No.: US 7,554,880 B2
(45) Date of Patent: Jun. 30, 2009

(54) MARINE SURVEYS

(76) Inventor: Ronald Stephen Fleming, 27 Clark Road, Ivanhoe, Victoria (AU) 3079

( * ) Notice: Subject to any disclaimer, the term of this patent is extended or adjusted under 35 U.S.C. 154(b) by 0 days.

(21) Appl. No.: 10/471,006

(22) PCT Filed: Mar. 8, 2002

(86) PCT No.: PCT/AU02/00269

§ 371 (c)(1),
(2), (4) Date: Feb. 13, 2004

(87) PCT Pub. No.: WO02/073241

PCT Pub. Date: Sep. 19, 2002

(65) Prior Publication Data

US 2004/0125697 A1 Jul. 1, 2004

(30) Foreign Application Priority Data

Mar. 9, 2001 (AU) .................... PR3647

(51) Int. Cl.
*G01V 1/38* (2006.01)
(52) U.S. Cl. .................... 367/16; 367/15; 367/19
(58) Field of Classification Search ............ 367/15, 367/19, 21, 16; 181/110; 114/244
See application file for complete search history.

(56) References Cited

U.S. PATENT DOCUMENTS

| | | | |
|---|---|---|---|
| 2,572,255 A | 10/1951 | Gallaway | |
| 2,632,150 A | 3/1953 | Silverman et al. | |
| 2,638,176 A | 5/1953 | Doolittle | |
| 3,256,501 A | 6/1966 | Smith, Jr. | |
| 4,737,938 A * | 4/1988 | Grau | 367/21 |
| 4,870,626 A | 9/1989 | Tveit | |
| 5,430,689 A | 7/1995 | Rigsby et al. | |
| 5,771,202 A | 6/1998 | Bale et al. | |
| 5,790,472 A * | 8/1998 | Workman et al. | 367/19 |
| 6,028,817 A | 2/2000 | Ambs | |
| 6,285,956 B1 * | 9/2001 | Bennett et al. | 702/14 |
| 6,590,831 B1 * | 7/2003 | Bennett et al. | 367/16 |
| 6,629,037 B1 * | 9/2003 | Nyland | 702/14 |
| 2003/0067842 A1 * | 4/2003 | Sukup et al. | 367/20 |

FOREIGN PATENT DOCUMENTS

| | | |
|---|---|---|
| EP | 989353 | 3/2000 |
| GB | 2342081 | 4/2000 |
| GB | 2345683 | 7/2000 |

OTHER PUBLICATIONS

Ashton, Peter. "3D Seismic Survey Design." Oilfield Review, Apr. 1994.*
Egan, et al. "Shooting direction: A 3-D marine survey design issue." Geophysics: The Leading Edge of Exploration, Nov. 1991.*

* cited by examiner

*Primary Examiner*—Jack W. Keith
*Assistant Examiner*—Scott A Hughes
(74) *Attorney, Agent, or Firm*—Nixon & Vanderhye PC (57) ABSTRACT

A method generates at least one route traversing a plurality of predetermined survey paths in a marine survey. The method includes generating a plurality of routes traversing a subset of the predetermined survey paths. The routes satisfy survey constraints such as run in and run out distances and minimum turn radius. Penalties are generated for the routes, including line change penalties, hazard penalties, streamer feather penalties, and penalties based on survey line priorities, total survey distance and duration, maintenance requirements, and the final location of the ship performing the survey. At least one of the routes is selected on the basis of the penalties.

34 Claims, 6 Drawing Sheets

MARINE SURVEYS

This application is the U.S. national phase of international application PCT/AU02/00269, filed Mar. 8, 2002, which designated the U.S.

BACKGROUND OF THE INVENTION

1. Field of the Invention

The present invention relates to marine seismic surveys, and in particular for a system and method for generating a route traversing survey lines of a marine seismic survey.

2. Related Art

Marine seismic surveys are used by oil companies to locate geological traps which may contain oil or gas, and to determine suitable drilling locations. In general, an oil company negotiates with governments to explore particular geographic areas. The company's geologists identify the most promising regions within these areas, and then design survey patterns that they hope will deliver the best information for the lowest cost. Survey patterns can be characterised as "2D" or "3D" survey patterns depending on the coarseness of the pattern in comparison with the features of interest. A typical "2D" survey pattern might consist of one hundred straight survey lines, ranging from 30 to 200 km in length arranged in an overlapping grid; A typical "3D" survey pattern might consist of a similar number of parallel lines more closely spaced.

Figure 1:
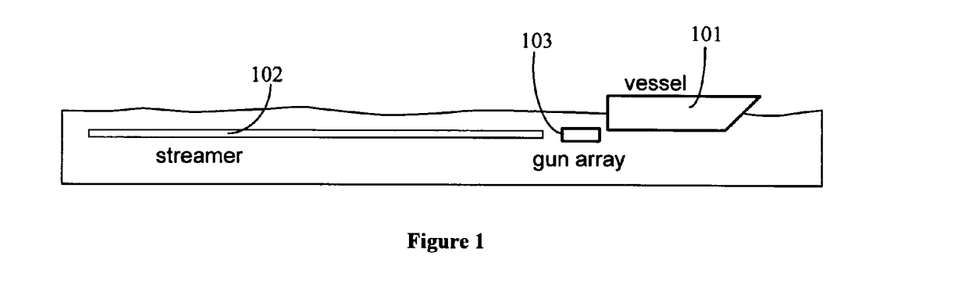
FIG. 1 is a schematic illustration of a seismic survey ship towing a seismic source and a streamer.

The survey is carried out by a vessel or ship 101 towing one or more long subsurface streamers 102 and one or more seismic sources 103, as shown in FIG. 1. Each source 103 is an array of compressed air guns that generates an intense shock wave or seismic pulse at regular intervals of time. Each streamer 102 is a long cable containing hydrophones along its length. As the ship sails along a straight line, the source 103 produces a seismic pulse that travels through the water and is reflected back towards the surface by structural layers beneath the sea floor. The hydrdphones inside each streamer 102 detect these reflected signals, the signal reaching each hydrophone having travelled along a different path. By analysing and correlating the reflected signals detected by the hydrophones, it is possible to construct a profile of the geological structure of the sea bed along the straight line followed by the ship. A map or model of the geological structure of a particular region of the sea floor can be generated from seismic data measured along a series of straight lines forming a mesh over the region of interest. Straight lines are used to facilitate analysis of the data from the array of hydrophones.

Figure 2:
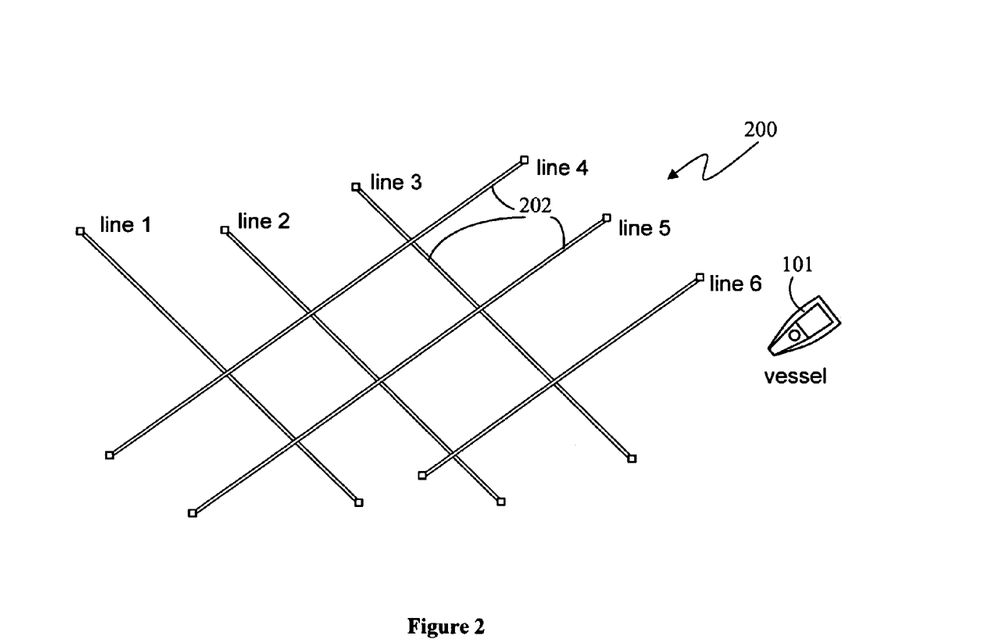
FIG. 2 is a plan view schematic diagram of a series of predetermined seismic survey lines, together with a survey ship.

A typical marine seismic survey pattern 200 comprises a series of straight lines 202, as shown in FIG. 2. The ship 101 towing the streamer 102 and seismic source 103 sails along each line, collecting seismic data. The process of travelling from the end of one line to the start of the next is referred to as a line change. During a line change, no seismic data is collected. It is therefore important to reduce the unproductive time spent by the ship 101 on line changes between survey lines. However, planning the order and direction in which to traverse the survey lines in order to improve productivity is not a trivial task. The ship 101 could take any one of an enormous number of possible routes along the series of lines. The problem is exacerbated by the need to ensure that the streamer 102 is straight when commencing to survey a specified survey line, and also by the minimum turn radius that the particular survey vessel can use. Moreover, if the survey area is in a tidal region or in shallow water, it may be important to allow for changing local currents and tide levels over potentially dangerous hazards. Furthermore, the ship's location at a particular time may be important, to meet a helicopter, for example. Furthermore, it may be necessary to allow time to perform maintenance or urgent repairs during line changes.

BRIEF SUMMARY OF THE INVENTION

Today, survey routes are planned manually, resulting in somewhat ad hoc routes that are not likely to be optimal. It is desired, therefore, to provide a system and method for generating a route traversing predetermined seismic survey paths in a marine seismic survey, or at least a useful alternative to existing methods and systems for route planning. The invention also may have application in relation to non-seismic hydrographic surveys and site surveys which are conducted at sea.

In accordance with the present invention there is provided a method for use in generating at least one route traversing a plurality of predetermined survey paths in a marine survey, including:
  generating a plurality of routes traversing at least a subset of said predetermined survey paths, said routes satisfying predetermined constraints;
  generating respective penalties for said routes; and
  selecting at least one of said routes on the basis of said penalties.

The present invention also provides a method for use in generating at least one route traversing a plurality of predetermined survey paths in a marine survey, including:
  (a) generating a plurality of partial routes, each partial route including a different subset of said predetermined survey paths, said partial routes satisfying predetermined constraints;
  (b) for each partial route, generating a set of corresponding extended routes by extending the partial route to include respective selected ones of remaining predetermined survey paths, said extended routes satisfying predetermined constraints;
  (c) generating penalties for said extended routes;
  (d) selecting a subset of said extended routes on the basis of said penalties; and
  (e) repeating steps (b)-(d), using said subset of extended routes as said set of partial routes.

The present invention also provides a method for evaluating a survey comprising a plurality of predetermined survey paths in a marine survey, including:
  generating a plurality of routes traversing a subset of said predetermined survey paths, said routes satisfying predetermined constraints;
  generating respective penalties for said routes;
  selecting at least one of said routes on the basis of said penalties;
  generating a route traversing said plurality of predetermined survey paths from the selected at least one of said routes; and
  evaluating said survey on the basis of a metric of said route.

The present invention also provides a system for controlling a marine survey, including:
  an interface to a positioning system for determining the current position of a survey vessel; and
  a marine survey system including means for generating navigational data for said survey vessel based on said current position to traverse said route.

BRIEF DESCRIPTION OF THE DRAWINGS

Preferred embodiments of the present invention are hereinafter described, by way of example only, with reference to the accompanying drawings, wherein.

DETAILED DESCRIPTION OF EXEMPLARY EMBODIMENTS

Figure 3:
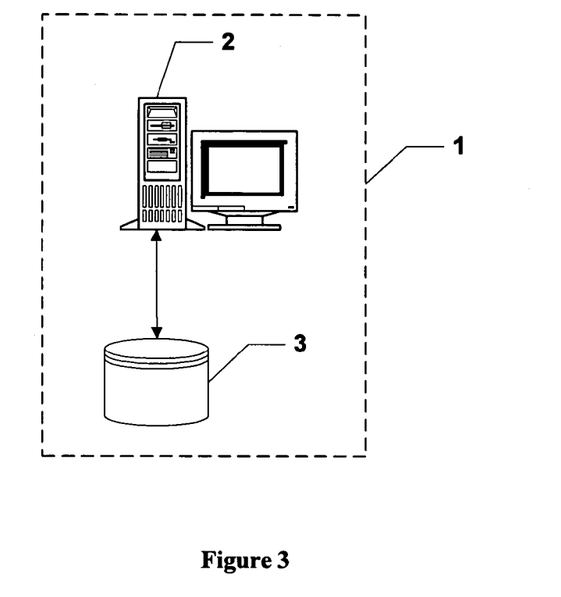
FIG. 3 is a block diagram of a preferred embodiment of a marine seismic survey planning system.

A survey planning system (SPS) 1, as shown in FIG. 3, executes a survey planning process that determines the overheads of a large number of possible marine seismic survey routes, based on supplied survey line coordinates and other constraints, and determines the most efficient routes from the set of generated routes; i.e., those traversing the shortest distance or requiring the least time. An implementation of the SPS 1 is described below and includes a standard computer system 2 with disk storage 3 having components provided by software modules stored and executed on the computer system 2, which may be a personal computer running a Microsoft Windows™ operating system. It will be apparent to those skilled in the art that the components of the SPS 1 may be distributed on one or more different computer systems in different locations connected by a communications network. Also at least some of the steps executed by the software modules of the SPS 1 may be executed by hardware circuits, such as application-specific integrated circuits (ASICs).

A survey pattern is provided to the SPS 1 as a text file containing the coordinates of each survey line in WGS84 or WGS90 (World Geodetic System) format, with one coordinate pair per line. The first coordinate pair in the file is the more Northerly end of the line, but if the line runs purely along an East-West direction, the more Easterly coordinate is given first. Each survey line is also given a name as the first token of the corresponding line of the text file. The SPS 1 reads the text file and generates a display of the survey pattern 200, providing the ability to select individual survey lines 202 for the purpose of specifying line properties, such as assigning priority to a particular survey line. Existing lines may be modified, and new lines may be added to the survey pattern 200. The SPS 1 also provides pull down menus and dialog windows for specifying numerous parameters for generating survey routes traversing the survey pattern 200.

Figure 4:
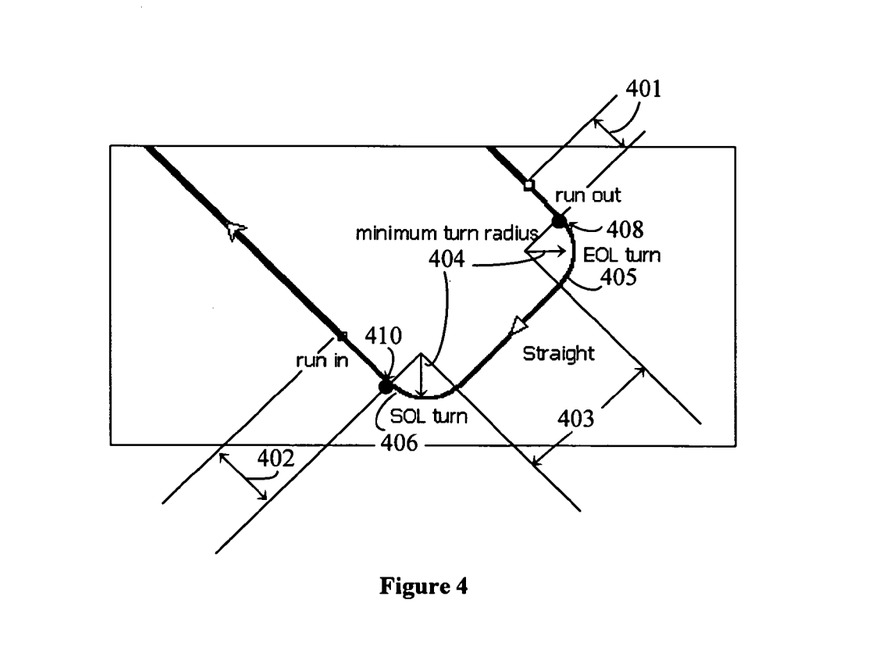
FIG. 4 is a schematic illustration of the parameters of a line change path traversed by a survey ship between survey lines.

The SPS 1 constructs the most efficient line change path to take from the end of one survey line and the beginning of the next, using a number of parameters specified by the user. When the ship 101 reaches the end of a survey line, it continues along the same direction until a specified length of the streamer 102 passes the end of the survey line. This length is referred to as the end-of-line (EOL) run out 401, as shown in FIG. 4. Similarly, the ship 101 travels an additional distance along the direction of the next survey line before the start of that line to ensure that a specified length of the streamer 102 is straight before passing the beginning of the survey line. This distance is known as the start-of-line (SOL) run in 402. The path taken by the ship 101 between the end 408 of the EOL run out 401 and the start 410 of the SOL run in 402 is a straight line 403 connected by the curved EOL 405 and SOL 406 turn segments determined by the minimum turn radius 404 of the ship 101. The SPS 1 generates a dialog window that allows the user to specify the total streamer length (bow to tailbuoy), the minimum turn radius 404, the SOL run in 402, and the EOL run out 401. The SPS 1 generates routes traversing a survey pattern that conform to these restrictions.

Figure 5:
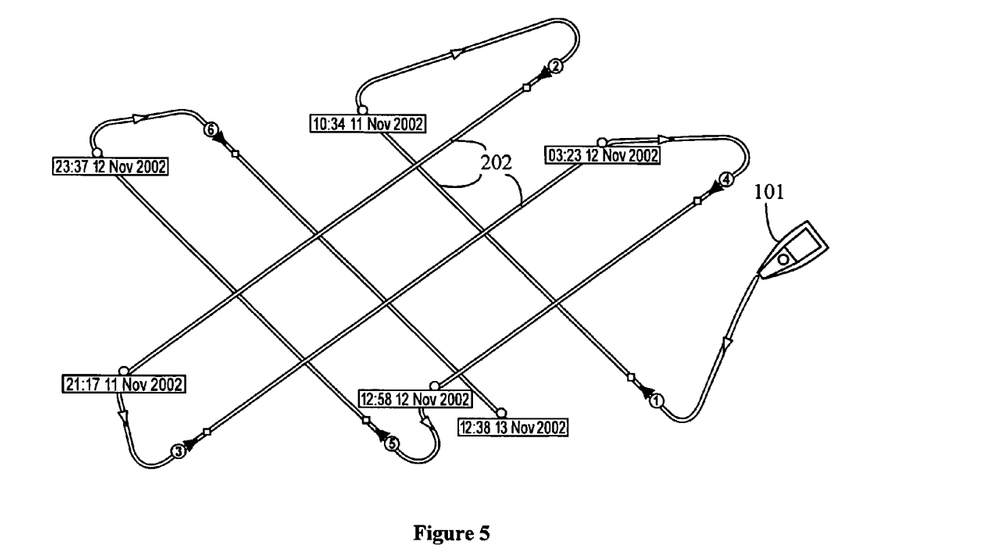
FIGS. 5 and 6 are schematic diagrams generated by the survey planning system, showing two routes through the survey lines shown in FIG. 2.
Figure 6:
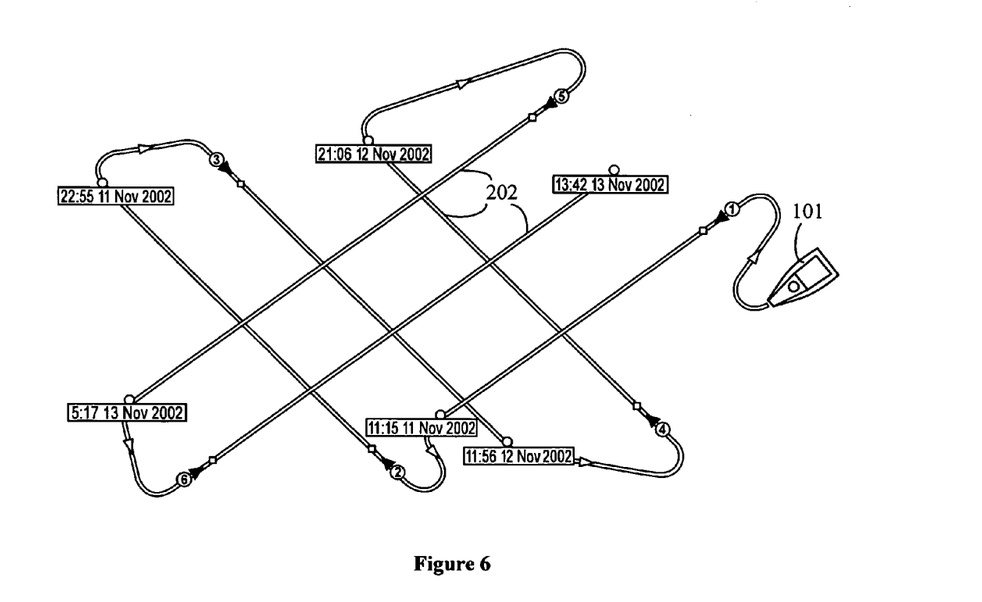
Figure 7:
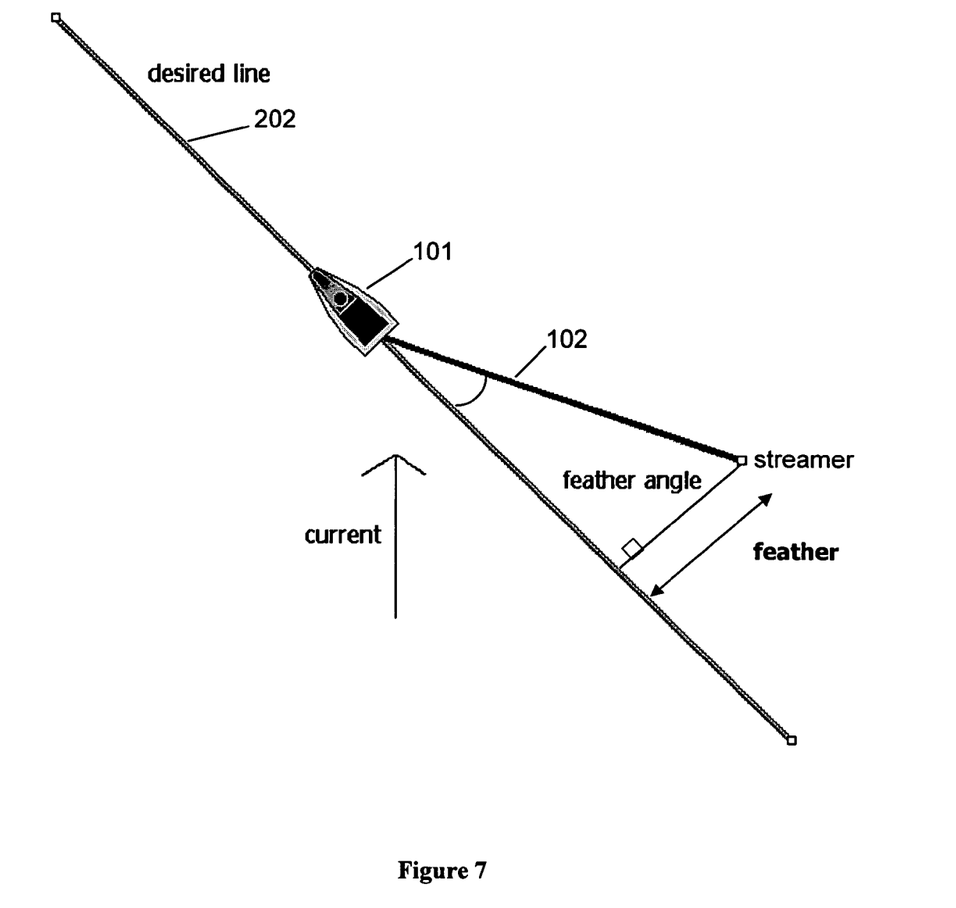
FIG. 7 is a schematic diagram illustrating feather in a survey.

FIGS. 5 and 6 show two routes generated by the SPS 1 for the set 200 of survey lines 202 shown in FIG. 2. In general, runs along two adjacent survey lines are not taken consecutively due to the above restrictions. The most efficient route can also depend upon the current position of the ship 101. Furthermore, routes can be subject to additional constraints, such as priorities or particular directions assigned to selected survey lines, tidal hazards in shallow waters (requiring the ship to avoid those areas at low tides), and the need to allow for maintenance time between selected survey lines. Finally, the orientation of the streamer 102 as it is towed along a survey line may not be the same as the orientation of the survey line due to water currents, resulting in a separation between the end of the streamer 102 and the survey line, known as 'feather', as shown in FIG. 7. Feather introduces errors in the survey data because the hydrophones attached to the streamer 102 do not measure data along the desired survey line when feather is present.

Therefore, it is desirable to reduce feather to improve the survey quality. It is also important to know the expected feather during surveys in which a number of streamers are towed by a ship. In this case, the feather determines the number of passes required to cover the survey area. This is particularly important at the end of a survey when the 'gaps' in the coverage are 'filled in'. Feather is determined by water currents and tides, introducing additional constraints on the times that survey lines should be surveyed, depending upon their orientations.

The SPS 1 generates quasi-optimal survey routes using a route search procedure. The procedure generates a number of candidate routes that satisfy one or more of the following requirements:

(i) minimise distance and/or duration;
(ii) cover priority lines as early as required;
(iii) avoid tidal hazards at low tides;
(iv) minimise feather encountered while acquiring data;
(v) allow required maintenance time; and
(vi) selectable bias towards routes that maximise production in the short-term.

The route search procedure takes these factors into account by assigning weights to each factor, depending upon their importance as specified by the user.

The SPS 1 displays candidate routes on the computer system 2, allowing the user to browse, compare and sort routes based on various criteria. The display can include the simulated movement of the ship 101 along the routes, showing projected tidal and other conditions, as described below. This assists the user to manually select a preferred route by considering the trade-offs involved. For example, the SPS 1 might determine two possible routes for a survey:

Route 1: Complete priority lines by 20/6, finish survey on 28/6

Route 2: Complete priority lines by 22/6, finish survey on 27/6

Either route may be chosen as the best route, depending on the needs of the user requiring the survey.

The enormous number of possible paths excludes the possibility of considering all possible paths through a survey. For example, in a survey with n lines which may be surveyed in either direction, there are n! $2^n$ possible paths. For a twenty line survey, there are $2.5 \times 10^{24}$ possible paths. Consequently, the procedure examines only a subset of all possible paths.

The search procedure includes two different search procedures: a short search procedure, and a tendril search procedure. The word tendril refers to a path consisting of survey lines joined by EOL run out 401, EOL turn 405, straight 403, SOL turn 406, and SOL run in 402 segments. The short search procedure searches from an end-of-line (EOL) point 408 for a number x of the nearest new (i.e., unvisited) SOL points 410, and for each of these generates every possible path up to n steps long. The best z paths are stored in a buffer. Execution time is approximately proportional to $x^n$. The short search is used to find short-term paths and to build a set of seed paths for a tendril search.

The tendril search generates paths over any number of lines by only searching a subset of promising paths. The search is seeded with a short search, as described above, and the z resultant partial paths are extended, one survey line at a time, in parallel. At each extension step, each path is extended to a number y of nearest adjacent unvisited SOL points 410. Each extension incurs a penalty related to the time it takes to traverse the path between the EOL point 408 and the new SOL point 410, plus a time-dependent bias factor associated with the SOL point 410, as described below. Only the z paths with the lowest accumulated penalties are kept, and the extension is continued until the set of survey lines is complete. For a survey with N lines, execution time is approximately proportional to z y N. Up to z complete paths are produced.

The search procedures are implemented as software modules written in the object-oriented language C++. The source code for these and supporting modules is given in the Appendix below. The searches are performed on a data set derived from the survey definition data. The software modules define a number of object classes and methods, as described below.

SEARCHDATA class objects are each used to store a complete set of TurnLists and Biases, indexed by point number. Point refers to the end point of a seismic survey line. A unique point number is assigned to each end of each line.

TurnList is a list of TURNLIST objects, indexed by EOL point number, where TURNLIST class objects represent the turns available from an EOL point. Turnlists include two data members, indexed by turn rank: SOL, an array of turn indices, and Duration, a corresponding array of turn durations. The term rank represents the ranking of the turns on the basis of duration, with turns of shorter duration having a lower (i.e., better) rank than longer turns.

BiasList is a list of BIAS objects, indexed by SOL point number, where BIAS class objects represent penalties applied to SOL points, and are used to bias a search towards or away from an SOL point. Penalties (which may effectively be bonuses) associated with starting a line at a particular time, are calculated from feather, line or priority data. If an SOL is reached at an unfavourable time (for example, when feather on a line is predicted to exceed a predetermined limit), the penalty added to the turn time makes the path less competitive relative to other paths. The data members of the class include TimeBias, a set of integers representing time-dependent biases at 30 minute intervals, and FixedBias, an integer representing a fixed bias, such as line priority or isolated lines. The method GetBias (long int Time) returns the sum of the fixed and time-dependent biases for an SOL at the specified time.

TENDRIL class objects represent complete or partial paths through a survey, and include the following data members:
Path an array of integers representing the indices of a sequence of points Visited an array of booleans indicating which points have been visited by this tendril
Step an integer giving the number of points visited so far
Time a long integer giving the elapsed time from the start of the path
Score a long integer giving the paths summed turn duration and bias.
pPoints a pointer to a SEARCHDATA object
TENDRIL class objects use the following methods during a search:
GrowTendrilTo (integer n) Try to extend the tendril by one line, by turning to the $n^{th}$ closest SOL. If this SOL has been visited already by this tendril, GrowTendrilTo( ) returns 0, otherwise it returns the new value of Score.
PruneTendril( ) Prune the tendril of its last visited line.
These methods automatically update Path, Visited, Step, Time and Score. Tendrils of similar Step may be compared on the basis of their Score. A lower Score generally indicates that the tendril has had shorter line changes, but may also indicate completed priority lines, good feather projections, etc.)
InsertMaintenance(long n, long t)
Schedules a turn of a minimum duration (t minutes) within the first n lines of the tendril's path. If a turn longer than specified already exists, then no change is made; otherwise, the longest turn is extended to the specified duration. This function is called after n lines during the Short Search.

TENDRILBUFFER objects hold lists of related tendrils of the same step number. The only data member is Tendril, which is a list of tendrils. TENDRILBUFFER objects use the method: InsertTendril (TENDRIL NewTendril), which adds a tendril to the buffer, replacing the tendril with the worst score.

The TENDRILSET class oversees and manages the search process. A TendrilSet has the following data members:
SearchData a SEARCHDATA object representing turns and biases.
Buffer1 a TENDRILBUFFER object.
Buffer2 a TENDRILBUFFER object.
pBestBuffer a pointer to either Buffer1 or Buffer2.
pWorkBuffer a pointer to either Buffer1 or Buffer2.
NumSteps an integer representing the number of lines to complete.
NumTendrils an integer representing the number of tendrils.
MaxShoots the maximum number of new SOLs from any one EOL.
MaxRank the maximum turn rank to be attempted from any one EOL.
The TENDRILSET class uses the following methods:
ShortSearch( ) generates a set of seed paths of a specified but limited number of steps.
TendrilSearch( ) generates a set of paths of any number of steps from seed paths generated by the ShortSearch( ) method.
GrowAllTendrils( ) is the main function called by TendrilSearch( ). It causes each Tendril in the WorkBuffer to extend itself to a number of adjacent points in turn, submitting the resulting extended tendrils to the BestBuffer.
SortBestTendrils( ) is a simple sort that sorts the resulting paths in order of merit.

A variety of parameters can be used to affect the behavior of the search. Some of these parameters influence the construction of the SearchData object, and some of them influence the search itself. The most significant factor influencing the search is the number of Tendrils maintained, NumTendriis. The larger the number of Tendrils, the greater the diversity of the paths and the more "long sighted" the search.

MaxShoots limits the number of growths made from each tendril at each EOL point. For example, if MaxShoots=4, then (at most) each tendril will grow to the four closest unvisited SOL points. This parameter effects the "diversity" of the search, defining the rate at which the set of tendrils 'fans out'.

MaxRank limits the Rank of turns tried at each point. For example, if MaxRank is 30, no turns higher than rank 30 will be tried from any point.

A, B, C, D, E and F affect the Short Search used to generate seed paths.

"A" defines how many of the available choices are tried from the start position;

"B" defines how many of the available choices are tried from the end of the first visited line;

"C" defines how many of the available choices are tried from the end of the second visited line; and so on.

The product A.B.C.D.E.F determines how long the short search will take.

These values can be increased for complex searches involving time-dependent conditions or maintenance, giving a wider range of potential paths examined.

In the Tendril Search, a large number of paths effectively compete with one another. In a completely unbiased search, the attractiveness of an SOL depends solely on how long it will take to get to it from the current EOL, measured in minutes. Bias factors applied to an SOL make the choice more or less attractive relative to other points, or other times. Negative biases make points more attractive and vice versa.

Priority bias defines the advantage given to priority lines. If a line is marked as priority, this value is subtracted from the fixed bias value associated with both of its potential SOL points. This makes the point more attractive to the Tendril Search, and causes the line to appear earlier in the resulting paths. This value is entered directly in the search dialog.

Isolation bias is a means of making the search visit isolated lines. Although it may be efficient to visit an isolated line early in a path, it may get ignored because of the inherently shortsighted competition between tendrils. The isolation bias makes isolated lines more attractive (and therefore more likely to be visited) by subtracting a proportion of the shortest turn to the point from its fixed bias. This has the effect of making all turns to the SOL equally more attractive. This percentage proportion is the foresight parameter referred to in the search dialog box generated by the SPS 1.

Time dependent biases alter the likelihood of starting a line at a particular times. They are calculated by a Time Bias Function, and are used to account for tidal, feather, priority or other time-dependent factors. Time dependent biases are calculated at half-hourly intervals and stored in the SOL's Time-Bias set as integers prior to a search.

Feather Bias is calculated for a particular SOL and time by determining the number of minutes the projected feather will exceed a feather limit during the shooting of the line. The results are multiplied by the Feather Bias Weighting to give the feather component of the Time Bias Function.

Tidal Bias is calculated for lines where there is overlap between the line and tidal hazards (reefs, shallow water etc). Tidal Bias is applied if the specified SOL time would cause an active tidal hazard to be traversed. Tidal bias is multiplied by a Tidal Bias Weighting to give the tide component of the Time Bias Function.

Priority Bias is calculated for lines with a specified "before" time by giving a bonus to SOLs before and a penalty after the specified time to give the priority component.

Figure 8:
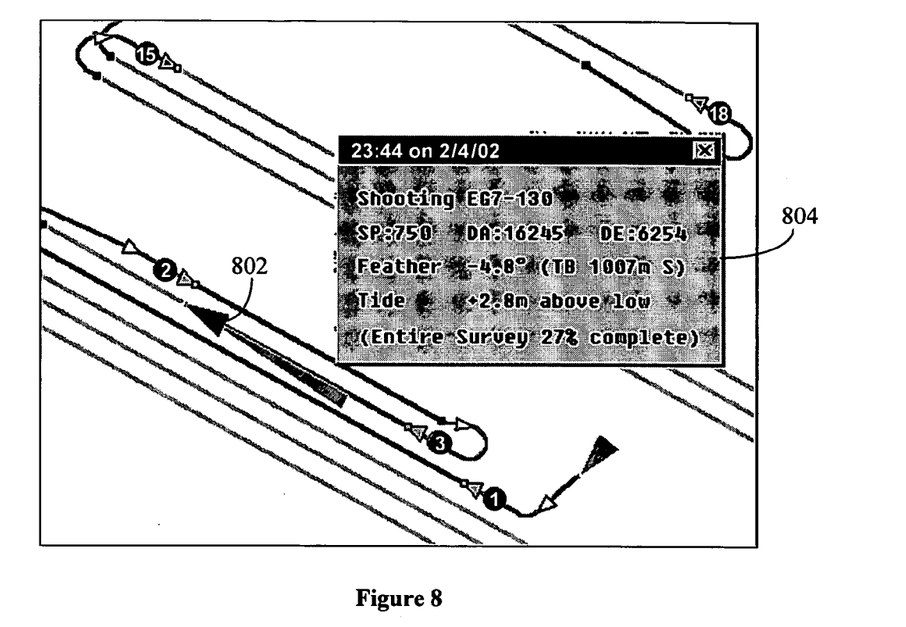
FIGS. 8 to 10 are screenshots of displays generated by the survey planning system.

The SPS 1 can be interfaced with the onboard navigation and positioning systems (e.g., a global positioning system (GPS)) of the ship 101 to obtain periodically updated information regarding ship position and orientation, feather, and survey progress. This allows the SPS 1 to generate an accurate 'live' display of the current position of the ship 101 as it traverses a route through a survey pattern, as shown in FIG. 8. The ship 101 is displayed as a black triangle 802, and a status window 804 displays the current survey line identifier, the location of the ship 101, the expected feather conditions, the tide conditions, and the fraction of the total survey that has been completed. By using a pulldown menu, the user can specify a time in the past or the future, and the SPS 1 then provides a similar display for the specified date and time. The expected location of the vessel is determined from input values for the speed of the vessel on survey lines, during line change turns, and during line change straight segments. Knowledge of the ship's current position and the selected survey route also allows the SPS 1 to generate navigational data for navigation of the ship 101.

Figure 9:
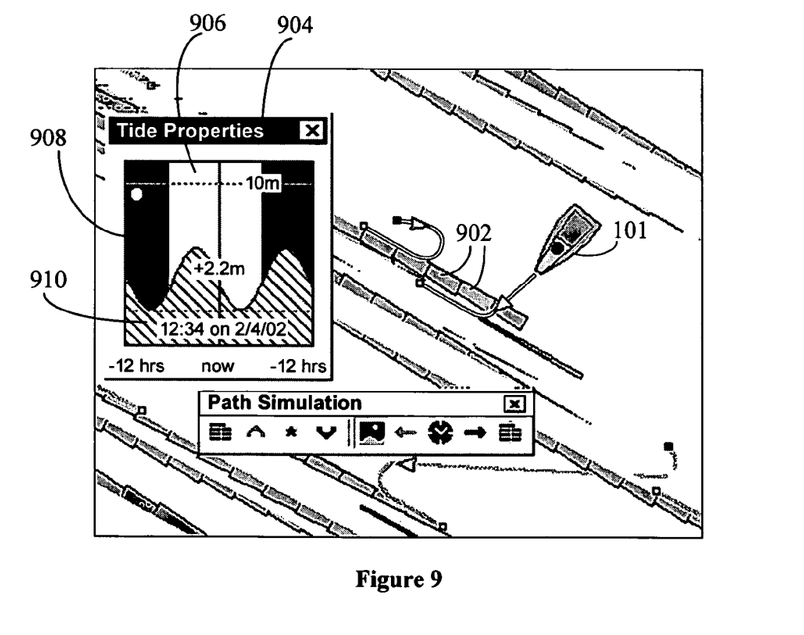

The SPS 1 includes a number of further display options for the user. As shown in FIG. 9, the predicted feather conditions along each survey line can be displayed as coloured wedges 902 along each survey line. A tide properties window 904 can be displayed, providing a graphic image showing tide conditions, including a numeric value for the current tide conditions, and a graphic representation of the variation in tide conditions for the previous and future twelve hours. Daytime and nighttime are indicated by white 906 and black 908 regions above a cross hatched area 910 representing the ocean.

Figure 10:
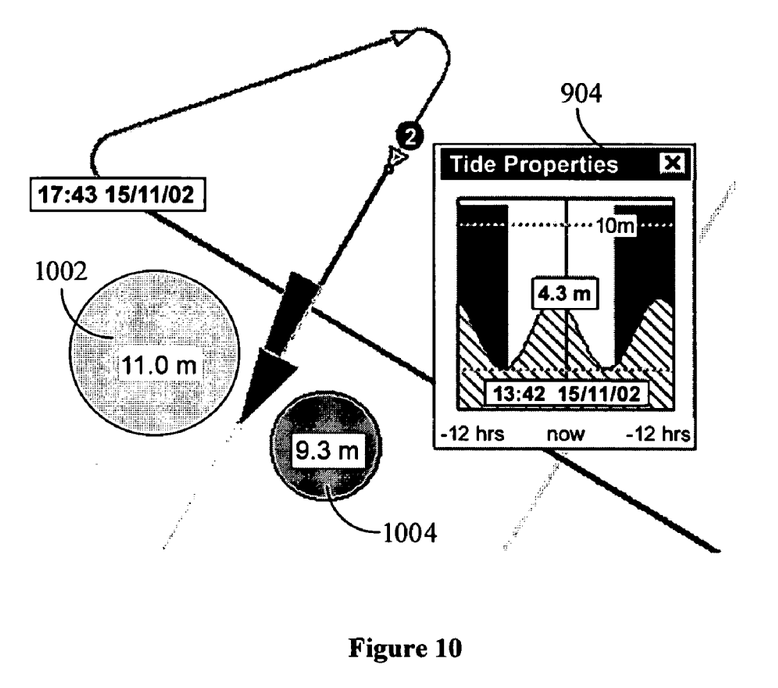

Submerged hazards are an important consideration for planning survey routes. As shown in FIG. 10, the SPS 1 displays the expected clearance over submerged hazards 1002, 1004. A safe hazard over which there is sufficient clearance to safely pass is displayed as a yellow circle 1002 (lightly shaded in FIG. 10), whereas an unsafe hazard over which is not safe to pass is displayed as an orange circle 1004 (more heavily shaded in FIG. 10). The tide properties display 904 provides the user with an indication of the relative tide conditions at the corresponding time and date.

The SPS 1 allows the user to determine completion times for potential new survey designs, depending on the vessel and equipment configuration used. Thus the user can compare alternative vessel and equipment configurations at the survey design or tendering stage in terms of survey duration and cost.

Many modifications will be apparent to those skilled in the art without departing from the scope of the present invention as herein described with reference to the accompanying drawings.

APPENDIX

```
int CTENDRILSET::ShortSearch( )
{
    //Generates a set of paths 6 lines long
    //can be more by adding extra loops
    //pBestBuffer is a pointer to a TENDRILBUFFER where the search
    //results will be stored
    //reset the best buffer
    pBestBuffer->ClearBuffer( );
    //pBestBuffer contains NumTendrils blank tendrils
    //integers a,b,c,d,e,f in loops represent turn rank numbers
    //for example, a=2,b=1,c=4,d=5,e=0,f=3
    //will create a tendril that attempts to
    //take the 3rd 'closest' SOL Point from the current location
    //then the 2nd 'closest' SOL Point to the location at end of step 1
    //then the 5th 'closest' SOL Point to the location at end of step 2
    //then the 6th 'closest' SOL Point to the location at end of step 3
```

APPENDIX-continued

```
//then the 1st 'closest' SOL Point to the location at end of step 4
//then the 4th 'closest' SOL Point to the location at end of step 5
//the following set of loops builds a tendril for all possible
//paths within the parameters.
//if an SOL Point has already VISITED by this tendril, the
//tendril is aborted when Tendril.GrowTendrilTo(n) returns 0.
A=8;B=6;C=6;D=6;E=6;F=4;
for (int a=0;a<A;a++) //at any FIRST TURN 8 choices attempted
 for (int b=0;b<B;b++)
  for (int c=0;c<C;c++) //these are
   for (int d=0;d<D;d++)
    for (int e=0;e<E;e++)
     for (int f=0;f<F;f++)  //at any SIXTH TURN 4 choices attempted
     {
      //create a new, blank Tendril as a local variable
      CTENDRIL Tendril;
      //reset it
      Tendril.ClearTendril ( );
      //grow Tendril to the ath closest SOL
      if (Tendril.GrowTendrilTo(a))
        //if 1st step's choice a was valid
        if (Tendril.GrowTendrilTo(b))
         //if 2nd step's choice b was valid
         if (Tendril.GrowTendrilTo(c))
          //if 3rd step's choice c was valid
          if (Tendril.GrowTendrilTo(d))
           //if 4th step's choice d was valid
           if (Tendril.GrowTendrilTo(e))
            //if 5th step's choice e was valid
            if (Tendril.GrowTendrilTo(f))
             //if the tendril made it to step 6
             //attempt to add the Tendril to best
             buffer
             pBestBuffer->Insert(Tendril);
     }
//pBestBuffer now contains NumTendrils good starting paths 6 lines
long
return(12) //12 is the current step number - 12 points (6 lines) visited
}
//nb : calls to InsertMaintenance removed for clarity
//eg
//if Nth step's choice X was valid
//       if (MaintainBefore == N)
//               InsertMaintenance(N, MaintenanceTime)
//
void CTENDRILSET::TendrilSearch( )
{
 //build the point set and turn ranking database
 //using info in the survey definition
 SearchPoints.CreateTurnSet(&SURVEYDEFINITION);
 //calculate time dependent bias look up table for all points
 SearchPoints.CreateBiasSet(&SURVEYDEFINITION);
 //perform a Short Search to build seed tendrils
 StepNumber =ShortSearch( );
 //keep growing Tendrils one step at a time until
 //desired number of steps performed
 while (StepNumber < NumSteps)
   StepNumber = GrowAllTendrils ( );
 //sort the tendrils into order of rank
 SortBestTendrils ( );
 //pBestBuffer now contains a set of tendrils of length NumSteps
 //that represent quasi optimal paths
}
int CTENDRILSET::GrowAllTendrils( )
{
 //last steps results are at pBestBuffer, so swap the two pointers
 swap (pBestBuffer,pWorkBuffer);
 //pBestBuffer  : empty
 //pworkBuffer : contains the best tendrils from the previous step
 //grow all the TENDRILS to a restricted number of adjacent points
 //extended TENDRILS are submitted for inclusion in pBestBuffer
 for (int Counter=0;Counter<NumTendrils;Counter++)
 {
  //NewRank is the Rank number of the turn being attempted
  int NewRank = 0;
  //New Shoots counts number of successful attempts
  int NewShoots = 0;
  do
  {
   //note GrowTendrilTo method returns 0 if turn was invalid
   //for example when the attempted turns SOL POINT has
   already
   //been visited by this tendril
   //attempt to make turn of rank [choice]
   if (pWorkBuffer->Tendril[Counter].GrowTendrilTo
    (NewRank)>0)
    //if the shoot was grown successfully,
    {
     //offer the now extended tendril to Best
     pBestBuffer->Insert(pWorkBuffer->Tendril[Counter]);
     //undo the turn ready for the next attempt
     pWorkBuffer->Tendril[Counter].PruneTendril( );
     //a shoot was grown, so
     NewShoots++;
    }
   //all growths successful or not use a choice so
   NewRank++;
  }
  while ((NewShoots < MaxShoots) && (NewRank < MaxRank));
  //reset the working tendril so that it can be reused
  pWorkBuffer->Tendril[Counter].ClearTendril ( );
 }
 //pBestBuffer   : NUMTENDRILS unsorted best tendrils with STEP
 N+1
 //pWorkBuffer : Empty
 return(pBestBuffer->Tendril[0].Step)
}
longint CTENDRIL::GrowTendrilTo(int nextchoice)
{
 //causes a tendril to extend itself by taking
 //the turn of rank nextchoice.
 //eg next choice = 2 will attempt the 3rd shortest line change
 //if the point to be turned to has been visited, returns 0
 //otherwise returns the new accumulated tendril score
 //Get a pointer to this Tendrils current EOL point's turn list
 TURNLIST *TurnList = &pPoints->TurnList[Currentpoint( )];
 //NewSOLPoint is the index of the next SOL POINT
 int NewSOLPoint = TurnList->SOL[nextchoice];
 //if this new SOL point has already been visited, abort this tendril
 if (Visited(NewSOLpoint)) return(0);
 //Find this new turns duration from the current EOL point's Turn List
 int TurnDuration = TurnList->Duration[nextchoice];
 //Add the turn duration to the tendrils current time to get the new
 SOL time
 Time += TurnDuration;
 //GetBias(CurrentTime) returns the sum of the fixed bias
 //and the time dependent bias associated with this SOL time -
 //if now is a bad time to travel to the newSOLPoint, eg due to high
 feather
 //GetBias will return a high value, penalizing this tendril
 //find bias associated with the new SOL point and time
 int Bias = pPoints->BiasList[NewSOLPoint].GetBias(CurrentTime);
 int NewStep = Step + 1;
 //Path is an array of EOL / SOL indexes, represents the PATH of the
 tendril
 Path[NewStep] = NewSOLPoint;
 //mark the SOLPoint as visited by this tendril
 SetVisited(NewSOLPoint, true);
 //add the cost of the turn
 Score = Score + TurnDuration + FixedBias + TimeBias;
 //add the duration of the new Line
 Time += LineDuration[NewSOLPoint];
 //the new EOL is the SOL index XOR 1, the opposite end of the Line
 int NewEOLPoint       = NewSOLPoint ^ 1;
 NewStep++;
 Path[NewStep]         = NewEOLPoint;
 Step                  = NewStep;
 SetVisited(NewEOLPoint,true);
 return(Score);
 //note : the storage of tendrils is inefficient (representing both ends
 of a line
 //in the path is actually redundant and may be refined)
}
```

The invention claimed is:

1. A marine survey planning method for execution by a computer system, said method comprising:

(a) accessing survey pattern data representing a set of straight survey lines for traversal by a marine vessel to perform a marine survey of a corresponding survey region, said set of straight lines comprising:
  (i) a set of parallel survey lines corresponding to said survey region; or
  (ii) a set of survey lines forming a mesh corresponding to said survey region;
(b) generating a plurality of partial survey routes for traversal by said marine vessel, each partial survey route including a different subset of plural said straight survey lines and at least one line change portion interconnecting responsive pairs of said survey lines of said subset, said partial survey routes satisfying predetermined constraints;
(c) for each partial survey route, generating a set of corresponding extended survey routes by extending the partial survey route to include respective selected remaining ones of said straight survey lines, said extended routes satisfying predetermined constraints;
(d) generating penalties for said extended survey routes;
(e) selecting a subset of said extended survey routes on the basis of said penalties; and
(f) repeating steps (c)-(e), using said subset of extended survey routes as said set of partial survey routes until a predetermined condition is met and then outputting survey route data representing at least one extended survey route.

2. A marine survey planning method as in claim 1 further comprising:
  generating a plurality of survey routes for traversal by said marine vessel, each of said survey routes including at least a subset of plural said straight survey lines and at least one line change portion interconnecting respective pairs of said survey lines of said included subset, said survey routes satisfying predetermined constraints;
  generating respective penalties for said survey routes;
  selecting at least one of said survey routes on the basis of said penalties; and
  outputting, on the basis of said selecting, survey route data representing at least one survey route for traversal by said survey vessel in order to survey said survey region, each said at least one survey route including said set of straight survey lines and a corresponding one of the selected at least one survey route.

3. A method as claimed in claim 1, wherein each partial survey route includes the same number of said survey lines.

4. A method as claimed in claim 1, wherein said predetermined condition is that each of said extended survey routes includes all members of said set of straight survey lines.

5. A method as claimed in claim 1, wherein said predetermined condition is that said set of extended survey routes includes all but at least one of said set of straight survey lines, and including:
  for each extended survey route, further extending said survey route to include possible partial survey routes traversing remaining members of said set of straight survey lines, said partial survey routes satisfying predetermined constraints;
  generating penalties associated with each of said extended survey routes; and
  selecting a subset of said extended survey routes on the basis of the penalty associated with each of said extended survey routes.

6. A method as claimed in claim 1, wherein said selected ones of said set of straight survey lines are selected on the basis of distances between the end of the partial survey route and ends of said straight survey lines.

7. A method as claimed in claim 1, wherein said step of generating a set of partial survey routes includes:
  selecting a plurality of start points, each start point corresponding to a respective one of said straight survey lines;
  generating, from each of said start points, possible partial survey routes traversing a at least one of said straight survey lines, said partial survey routes satisfying predetermined constraints;
  generating penalties for said partial survey routes; and
  selecting a subset of said partial survey routes on the basis of said penalties.

8. A method as claimed in claim 1, including:
  generating survey routes traversing said set of parallel survey lines;
  displaying said survey routes for comparison; and
  selecting at least one survey route as said set of straight survey lines on the basis of said comparison.

9. A method as claimed in claim 1, wherein said constraints include run in, run out and turn constraints.

10. A method as claimed in claim 1, wherein said penalties include penalties for line changes between straight survey lines.

11. A method as claimed in claim 1, wherein said step of generating penalties includes generating penalties on the basis of at least one of time, distance and location.

12. A method as claimed in claim 1, wherein said step of generating penalties includes generating penalties on the basis of respective predetermined priorities for selected ones of said straight survey lines.

13. A method as claimed in claim 1, wherein said step of generating penalties includes generating one or more penalties for respective hazards.

14. A method as claimed in claim 1, wherein said step of generating penalties includes generating one or more time-dependent penalties.

15. A method as claimed in claim 14, wherein said time-dependent penalties include feather offset penalties.

16. A method as claimed in claim 14, wherein said time-dependent penalties include feather projection penalties.

17. A method as claimed in claim 14, wherein said time-dependent penalties include penalties for at least one tidal hazard.

18. A method as claimed in claim 1, wherein said step of generating penalties includes generating one or more penalties based on survey completion location.

19. A method as claimed in claim 1, wherein said step of generating penalties includes generating one or more penalties based on maintenance requirements.

20. A method as claimed in claim 1, including determining locations for a survey vessel at future times on a selected route.

21. A method as claimed in claim 20, including generating a simulated live display of movement of said vessel on said survey route.

22. A method as claimed in claim 20, including determining tide levels for said vessel at said times.

23. A method as claimed in claim 22, including determining clearances between said vessel and at least one hazard at said times.

24. A method as claimed in claim 22, including displaying tidal data.

25. A method as claimed in claim 20, including determining water currents at said times.

26. A method as claimed in claim 25, including determining streamer feather values at said times.

27. A marine survey planning method as in claim 1 further comprising:
   generating a survey route traversing said set of straight survey lines from a selected at least one of said survey routes;
   evaluating said selected survey on the basis of a metric of said survey route; and
   outputting data representing the evaluated survey.

28. A method as claimed in claim 27, wherein said metric includes at least one of survey duration and survey cost.

29. A method as claimed in claim 27, including evaluating a number of surveys and determining metrics for said surveys, respectively, and selecting one of said surveys on the basis of said metrics.

30. A method as claimed in claim 29, wherein said surveys have differences in at least one of vessel configuration, streamer configuration, and survey pattern.

31. A computer readable storage medium having stored thereon program code for executing the steps of claim 1.

32. A marine survey planning method as in claim 1, wherein said plurality of partial survey routes also provide a plurality of survey routes traversing at least a subset of plural said straight survey lines and at least one line change portion interconnecting respective pairs of said survey lines of said subset, said survey routes satisfying predetermined constraints;
   generating respective penalties for said survey routes;
   selecting at least one of said survey routes on the basis of said penalties; and
   outputting data representing the selected at least one survey route.

33. A marine survey planning method comprising:
   (a) accessing survey pattern data representing a set of straight survey lines for traversal by a marine vessel to perform a marine survey of a corresponding survey region, said set of straight lines comprising:
      (i) a set of parallel survey lines corresponding to said survey region; or
      (ii) a set of survey lines forming a mesh corresponding to said survey region;
   (b) generating a plurality of partial survey routes, each partial survey route including a different subset of plural said straight survey lines and at least one line change portion interconnecting respective pairs of said survey lines of said subset, said partial survey routes satisfying predetermined constraints;
   (c) for each partial survey route, generating a set of corresponding extended survey routes by extending the partial survey route to include respective selected remaining ones of said straight survey lines, said extended survey routes satisfying predetermined constraints;
   (d) generating penalties for said extended survey routes;
   (e) selecting a subset of said extended survey routes on the basis of said penalties; and
   (f) repeating steps (c)-(e), using said subset of extended survey routes as said set of partial survey routes until a predetermined condition occurs and then outputting data representing at least one of said extended survey routes.

34. A marine survey planning method as in claim 33 further comprising:
   generating a route including said set of straight survey lines from a selected at least one of said survey routes;
   evaluating said selected survey on the basis of a metric of said route; and
   outputting data representing the evaluated survey.

* * * * *